(12) United States Patent
Peng et al.

(10) Patent No.: US 12,057,593 B2
(45) Date of Patent: Aug. 6, 2024

(54) DUAL REAL TIME CLOCK (RTC) BATTERY HOLDER AND METHOD OF MANUFACTURE

(71) Applicant: Dell Products, LP, Round Rock, TX (US)

(72) Inventors: Chih-Nan Peng, Zhonghe Dist (TW); Feng-Cheng Chang, Taipei (TW); Chung-An Lin, Zhonghe Dist (TW)

(73) Assignee: DELL PRODUCTS LP, Round Rock, TX (US)

( * ) Notice: Subject to any disclaimer, the term of this patent is extended or adjusted under 35 U.S.C. 154(b) by 613 days.

(21) Appl. No.: 17/374,413

(22) Filed: Jul. 13, 2021

(65) Prior Publication Data

US 2023/0018206 A1  Jan. 19, 2023

(51) Int. Cl.
*H01M 50/216* (2021.01)
*H01M 50/284* (2021.01)
*H01M 50/512* (2021.01)

(52) U.S. Cl.
CPC ....... *H01M 50/216* (2021.01); *H01M 50/284* (2021.01); *H01M 50/512* (2021.01)

(58) Field of Classification Search
CPC . H01M 50/216; H01M 50/284; H01M 50/512
See application file for complete search history.

(56) References Cited

U.S. PATENT DOCUMENTS

| | | | |
|---|---|---|---|
| 5,922,489 A | 7/1999 | Adachi |
| 6,062,901 A | 5/2000 | Liu |
| 6,302,454 B1 | 10/2001 | Tsurumaru |
| 8,057,930 B2 | 11/2011 | Ornt |
| 9,515,301 B2 | 12/2016 | Hattori |
| 2001/0009065 A1 | 7/2001 | Chow |

*Primary Examiner* — Jane J Rhee
(74) *Attorney, Agent, or Firm* — Prol Intellectual Property Law, PLLC; H. Kenneth Prol

(57) ABSTRACT

A dual real-time clock battery power unit may comprise a top battery housing for retaining a first battery, having an exterior fastener arm for partially inserting beneath an exterior fastener lip of a bottom battery housing for retaining a second battery when the top and bottom battery housings are in a closed clamshell configuration. A positive terminal for contacting a second battery positive surface, and a bottom negative terminal for contacting a second battery negative surface may be mounted within the bottom battery housing. A top negative terminal may be mounted within the top battery housing to contact a first battery negative surface. The top and bottom battery housings may be operably connected to form the closed clamshell configuration disposing the bottom battery housing between the top battery housing and a printed circuit board (PCB), and electrically coupling the PCB to the top and bottom batteries, forming a parallel circuit.

20 Claims, 6 Drawing Sheets

DUAL REAL TIME CLOCK (RTC) BATTERY HOLDER AND METHOD OF MANUFACTURE

FIELD OF THE DISCLOSURE

The present disclosure generally relates to battery retention devices. The present disclosure more specifically relates to a battery holder for securely placing two Real-Time Clock (RTC) batteries in parallel.

BACKGROUND

As the demand for mobility of computing devices increases, so too does the demand for efficient, long-lasting, light-weight power delivery systems of smaller volumes. Real-time clock (RTC) batteries, otherwise known as button batteries provide such an efficient power source while consuming minimal space within electronic devices. Battery holders for retaining such RTC batteries include a battery housing for enclosing or partially enclosing an RTC battery, as well as positive and negative terminals for contacting the positive terminal and negative terminal surfaces of the enclosed RTC battery, respectively. The positive and negative terminals may extend beyond the exterior of the battery housing to operatively couple with or electrically couple with a printed circuit board (PCB) of the electronic device to which the battery may deliver power.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
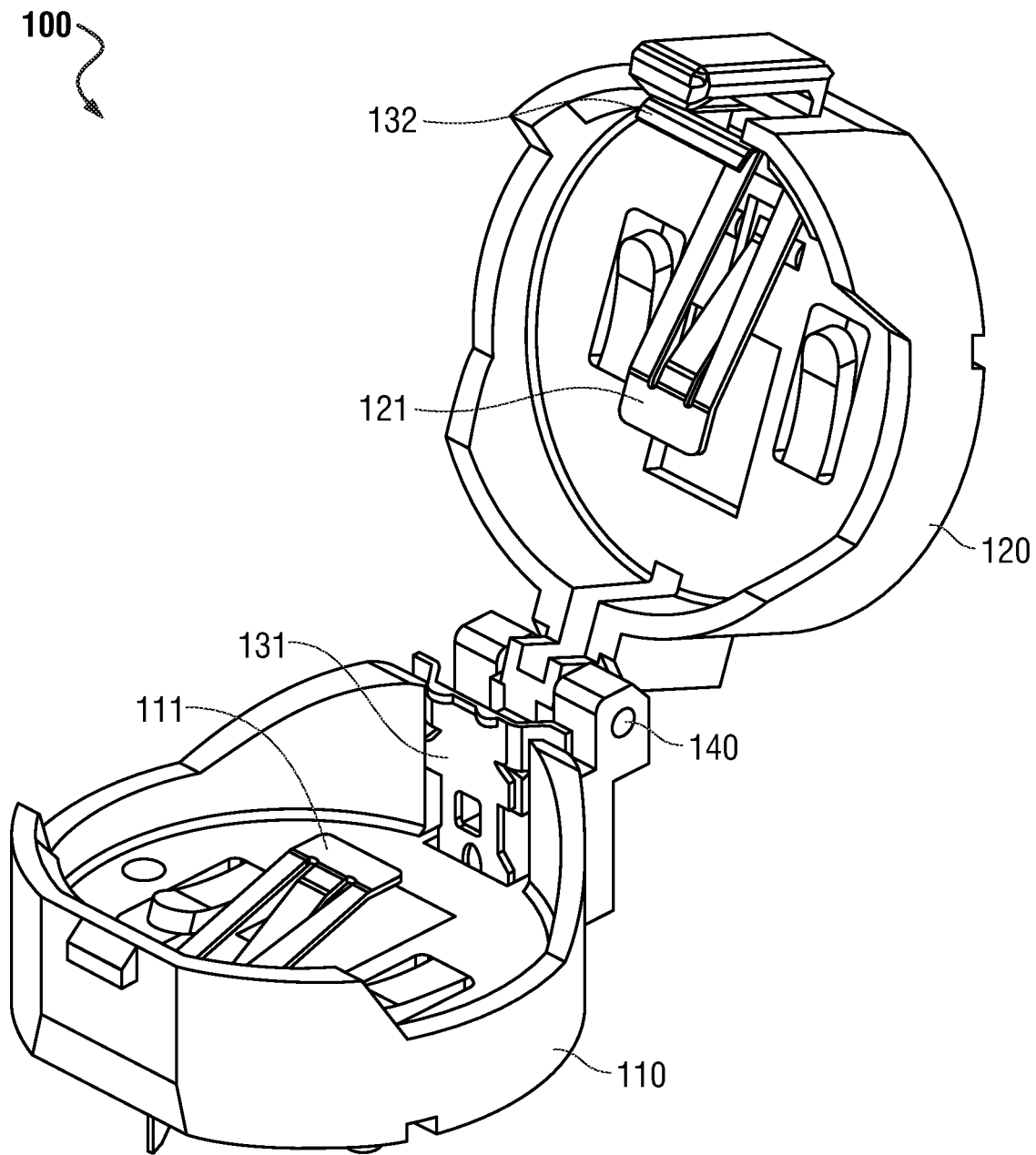
FIG. 1 is a perspective view graphical illustration of a dual real-time clock (RTC) battery holder according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

There is an ever-growing demand for computing devices capable of performing increasingly complex tasks while remaining small, lightweight, and portable. As the complexity of tasks increases, so too do the number of components housed within these electronic devices, and the power demands of these various components. In order for some functions to continue even during a power-off state, such electronic devices incorporate battery power sources, such as real-time clock (RTC) batteries, otherwise known as button batteries. These RTC batteries provide power to electronic devices while occupying a relatively small volume. For example, commonly used RTC batteries include the CR2032 battery, measuring 20 mm in diameter and 3.2 mm in thickness, and the CR2450 battery, measuring 24 mm in diameter and 5.0 mm in thickness.

Manufacturers of electronic devices incorporating such RTC batteries balance several factors to produce a safe and reliable electronic device at low cost. For example, consumers value light-weight devices with long battery life of more than three years. Manufacturers may achieve longer battery life by incorporation of batteries having a greater capacity. However, this shift may be associated with a steep increase in costs or occupancy of additional space. For example, a the CR2450 battery, having a maximum capacity of 620 mAh may cost up to five times more than the CR2032 battery, having a maximum capacity of 240 mAh. Manufacturers could achieve a capacity of 480 mAh by placing two CR2032 batteries in parallel with one another, for ⅔ths the cost of incorporating a single CR2450 battery, for example. This may be a good compromise between competing demands of cost and battery life, but may result in an increase in the surface area of the PCB of an electrical device that must be dedicated to mounting such batteries. A solution is needed that increases overall battery life at low cost, without increasing the surface area of the PCB dedicated to mounting the batteries.

Manufacturers must also weigh these demands for long battery life and small size against safety requirements set by standards organizations and cost of manufacturing these products. For example, the International Electrotechnical Commission (IEC) has published the IEC62368 4.8.3 hazard-based product-safety standard for ICT and AV equipment sold in the United States and the European Union, which requires that batteries incorporated within compliant electronic devices not be easily seen or removed by small children. For example, currently existing battery holders that allow a user to easily snap a CR2032 battery into place beneath a single retaining lip, leaving the battery largely visible during operation may fail to adhere to this standard. A solution is needed that more securely houses such batteries, and obscures them from view during operation.

The dual RTC battery holder of the present disclosure addresses these issues by housing two RTC batteries, stacked vertically atop the PCB, and secured by a dual-latch protection system. A top housing and a bottom housing of the dual RTC battery holder in embodiments of the present disclosure may each house a single RTC battery, and may be mechanically coupled to one another via a hinge joint. When placed in a closed configuration, the top housing may stack directly atop the bottom housing, such that the negative terminal bottom surface of the bottom battery is situated closest to the PCB to which the bottom housing is operatively coupled, and such that the positive terminal surfaces of the top battery and bottom battery face one another. In other words, the top and bottom batteries may have inverted positions with respect to one another. Each battery may be retained within its individual housing with an interior retaining lip that fixes the battery position within the housing when the holder is placed in either an open or a closed configuration. As a second security measure, the top housing may include an exterior fastener molded plastic arm that snaps into place beneath an exterior fastener lip of the bottom housing to firmly close and latch the top and bottom housings together. The bottom battery 412 may be enclosed within the bottom battery housing 410, the top battery 422 may be enclosed within the top battery housing 410, and the top and bottom battery housings 410 and 420 may be firmly closed together when placed in the closed configuration required for operation of the batteries 412 and 422. Consequently, the dual RTC battery holder in an embodiment may securely house both batteries 412 and 422 while obscuring them from view during operation, in accordance with the requirements of the IEC62368 standards.

The dual RTC battery holder of the present disclosure may also increase the total battery life without increasing the surface area of the PCB dedicated to operatively coupling with such batteries. By stacking the top and bottom housings vertically atop the PCB, as described directly above, the surface area of the PCB dedicated to operatively coupling with the dual RTC battery holder is limited to the surface area of the PCB located directly beneath the bottom housing. In other words, addition of the second battery within the top housing in embodiments described herein may be achieved without increasing the surface area of the PCB dedicated to operatively coupling with the battery housings beyond that required for existing single-battery holder solutions.

Further, the dual RTC battery holder of the present disclosure may place the top and bottom batteries, housed within the top and bottom housings, respectively, in parallel with one another, in order to increase the current, and thus lifetime of the combined batteries (e.g., as measured in mAh, or current over time). Both the top housing and bottom housing may incorporate a negative terminal for contacting the negative terminal surface of the respective battery inserted therewithin. The negative terminals may be installed into machined cavities to include a portion that extends across the exterior circumference of a battery, beyond the positive terminal surface. Thus, when the dual RTC battery holder is placed in a closed configuration, the negative terminal incorporated within the top housing may extend downward beyond the positive terminal surface of the top battery, and the negative terminal incorporated within the bottom housing may extend upward beyond the positive terminal surface of the bottom battery. When clasped shut by the exterior fastener molded plastic arm, as described directly above, the downwardly extended portion of the top housing negative terminal may come into electrically conductive contact with the upwardly extended portion of the bottom housing negative terminal. The bottom housing may further incorporate a positive terminal extending away from the PCB, across the outer circumference of the bottom battery to contact the positive terminal surface of the bottom battery. This positive terminal may further extend beyond the positive terminal surface of the bottom battery, such that a portion of the positive terminal also forms an electrically conductive contact with the positive terminal surface of the top battery when the dual RTC battery holder is placed in a closed configuration. The positive terminal and negative terminal may also be electrically coupled to the PCB, for example, through soldering. In such a way, the dual RTC battery holder may securely and safely house two RTC batteries in parallel for delivering power to the PCB.

FIG. 1 is a perspective view graphical illustration of a dual RTC battery holder placed in an open configuration according to an embodiment of the present disclosure. The dual RTC battery holder 100 in an embodiment may comprise a bottom battery housing 110 mechanically coupled to a top battery housing 120. For example, as shown in FIG. 1, the bottom battery housing 110 may be mechanically joined to the top battery housing 120 via a hinge joint 140. Both the bottom battery housing 110 and top battery housing 120 may be formed of any electrically non-conductive material capable of retaining an RTC battery, including, for example, various plastics or ceramics. The bottom battery housing 110 and top battery housing 120 may, for example, be formed via a plastic molding, injection molding, or three-dimensional printing method. These housings (e.g., 110 and 120) may each be molded, printed, or otherwise manufactured to have an interior surface circumference capable of retaining an RTC battery of a known size. For example, the housings (e.g., 110 and 120) in an embodiment may have interior diameters measuring slightly larger than 20 mm to allow for insertion of a CR2032 battery.

A bottom negative terminal 111 and a positive terminal 131 may be inserted partially within or otherwise mounted to the bottom battery housing 110, as is commonly performed with existing battery holders. In a similar manner, a top negative terminal 121 may be inserted partially within or otherwise mounted to the top battery housing 120. The top negative terminal 121, bottom negative terminal 111, and positive terminal 131 may be machined or made of pressed material such as any type of electrically conductive material, such as copper, zinc, aluminum, gold, or silver, for example. The top negative terminal 121 and bottom negative terminal 111 in an embodiment may be formed or machined to include extended portions (e.g., extended portion 132 of the top negative terminal 121) that may come into contact with one another when the dual RTC battery holder 100 is placed in a closed configuration, as described in greater detail with respect to FIG. 4, below. The positive terminal 131 in an embodiment may also be machined or formed to include an extended portion that may come into contact with the positive terminal surface of the top battery housed within the top battery housing 120 when the dual RTC battery holder 100 is placed in a closed configuration, as also described in greater detail with respect to FIG. 4, below.

Figure 2:
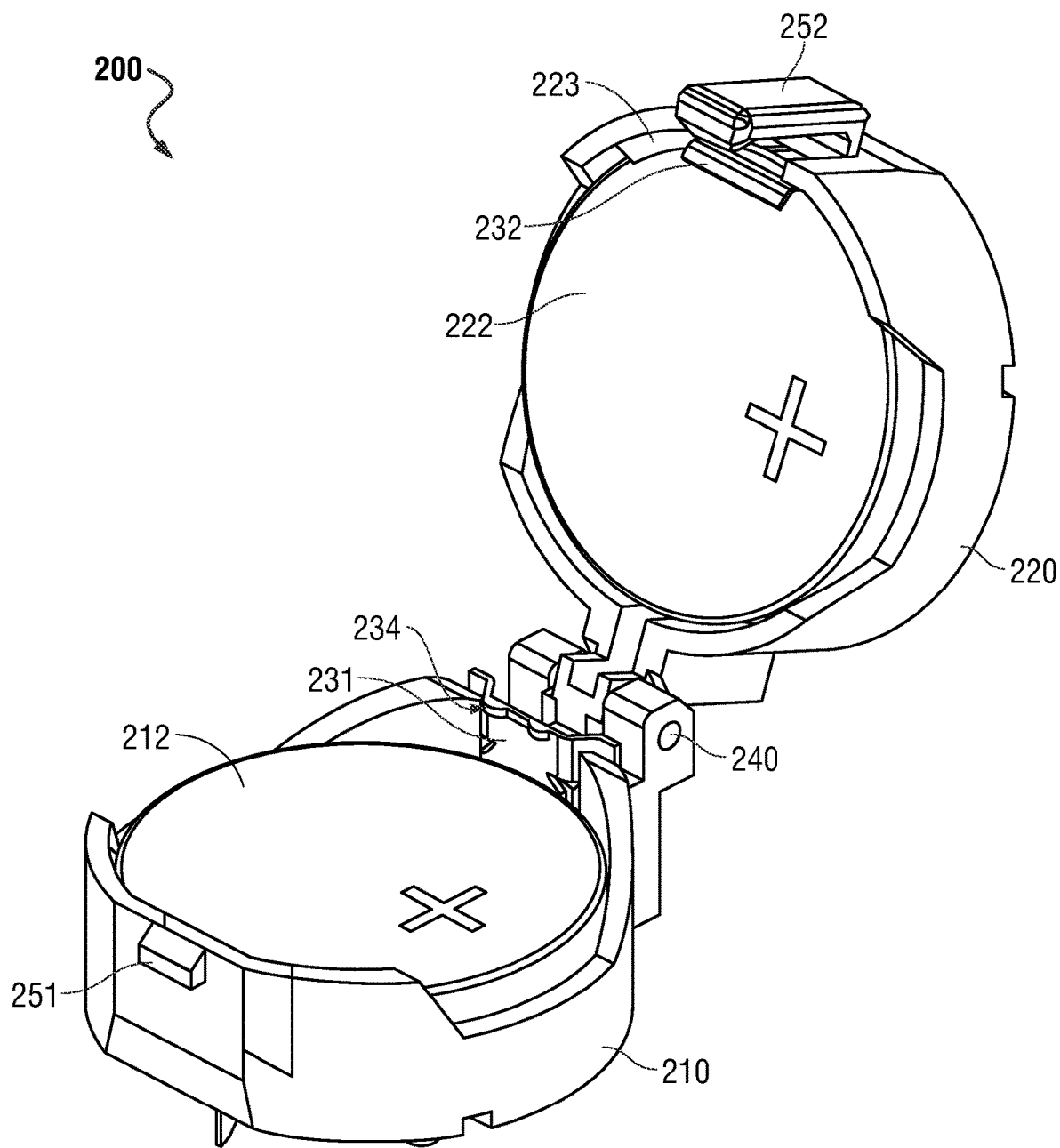
FIG. 2 is a perspective view graphical illustration of RTC batteries inserted within a dual RTC battery holder according to an embodiment of the present disclosure.

FIG. 2 is a perspective view graphical illustration of RTC batteries inserted within a dual RTC battery holder placed in an open configuration according to an embodiment of the present disclosure. A bottom battery 212 may be inserted within the bottom battery housing 210, and a top battery 222 may be inserted within the top battery housing 220, for example. As described herein, each battery may be retained within its individual housing with an interior retaining lip that fixes the battery position within the housing when the holder is placed in either an open or a closed configuration. For example, the top battery 222 may be inserted within the top battery housing 220 and retained therewithin by a top interior retaining lip 223 formed as a lip protruding radially inward from the interior surface of the top battery housing 220. Upon insertion of the top battery 222 in such an embodiment, a portion of the top interior retaining lip 223 may protrude partially across the positive terminal surface (e.g., the surface visible within FIG. 2) of the top battery 222. The bottom battery housing 210 in an embodiment may further include a similar bottom interior retaining lip (not shown), as described in greater detail with respect to FIG. 4, below. As a second security measure, the top battery housing 220 may include an exterior fastener molded plastic arm 252 that snaps into place beneath an exterior fastener lip 251 of the bottom battery housing 210 to firmly close and latch the top and bottom housings together when placed in a closed configuration, as described in greater detail below with respect to FIG. 4. The bottom battery 412 may be enclosed within the bottom battery housing 410, the top battery 422 may be enclosed within the top battery housing 410, and the top and bottom battery housings 410 and 420 may be firmly closed together when placed in the closed configuration required for operation of the batteries 412 and 422. Consequently, the dual RTC battery holder in an embodiment may securely house both batteries 412 and 422 while obscuring them from view during operation, in accordance with the requirements of the IEC62368 standards.

As described herein, a top negative terminal may be incorporated within the top battery housing 220 in an embodiment may be machined or formed to include an extended portion 232 that may come into contact with an extended portion of a bottom negative terminal when the dual RTC battery holder 200 is placed in a closed configuration, as described in greater detail with respect to FIG. 4, below. The positive terminal surface of the bottom battery 212 may be placed in electrically conductive contact with the positive terminal 231 mounted within the bottom battery housing 210 upon insertion of the bottom battery 212 therewithin, in an embodiment. The positive terminal 231 in an embodiment may also be machined or formed to include an extended portion 234 that may come into contact with the positive terminal surface of the top battery 222 housed within the top battery housing 220 when the dual RTC battery holder 200 is placed in a closed configuration, as also described in greater detail with respect to FIG. 4, below.

Figure 3:
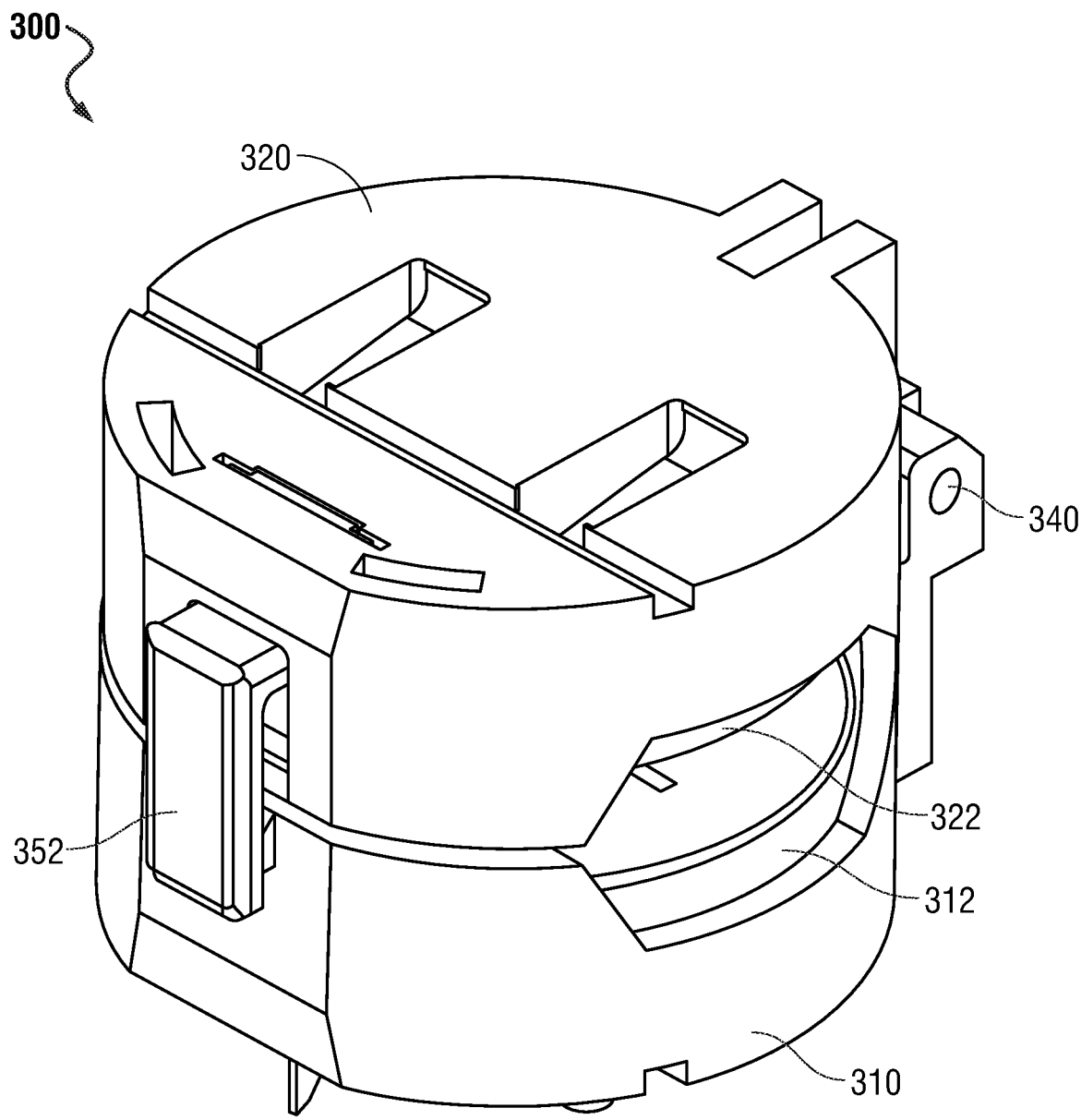
FIG. 3 is a perspective view graphical illustration of a dual RTC battery holder placed in a closed configuration according to an embodiment of the present disclosure.

FIG. 3 is a perspective view graphical illustration of an RTC battery inserted within a dual RTC battery holder placed in a closed configuration according to an embodiment of the present disclosure. As described herein, the dual RTC battery holder 300 in an embodiment may house two RTC batteries, stacked vertically atop one another, and secured by a dual-latch protection system. A top housing 320 and a bottom housing 310 of the dual RTC battery holder 300 in an embodiment may each house a single RTC battery (e.g., bottom battery 312 housed within bottom battery housing 310 and top battery 322 housed within top battery housing 320), and may be mechanically coupled to one another via a hinge joint 340.

Figure 4:
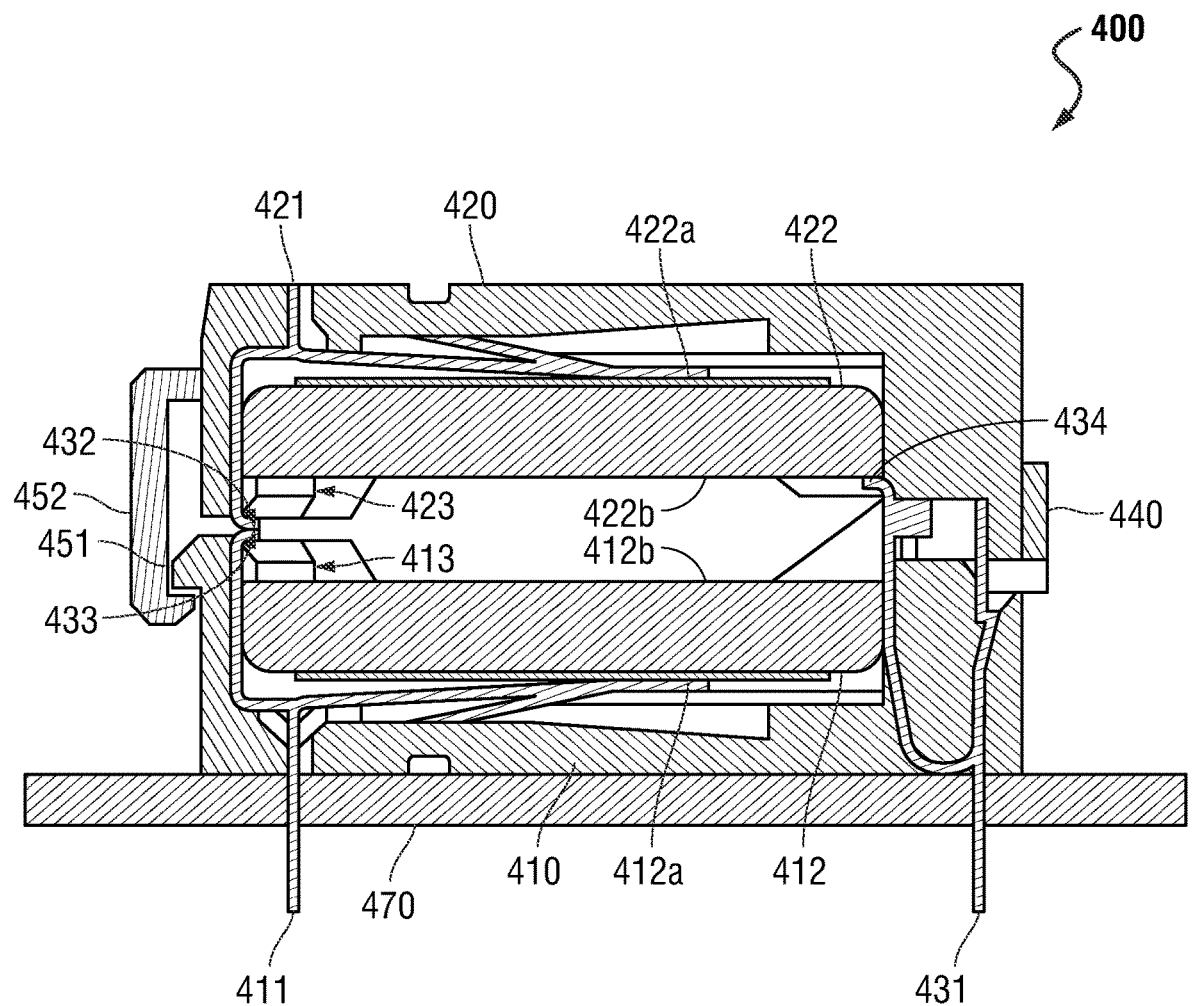
FIG. 4 is a cross-sectional view graphical illustration of a dual RTC battery power unit according to an embodiment of the present disclosure.

Each battery (e.g., 312) may be retained within its individual housing (e.g., bottom battery housing 310) with an interior retaining lip that fixes the position of the battery (e.g., 312) within the housing (e.g., bottom battery housing 310) when the holder is placed in either an open or a closed configuration, as described in greater detail herein with respect to FIGS. 2 and 4. As a second security measure, the top battery housing 320 may include an exterior fastener molded plastic arm 352 that snaps into place beneath an exterior fastener lip (e.g., 251 shown in FIG. 2) of the bottom battery housing 310 to firmly close and latch the top and bottom battery housings 310 and 320 together. Because each battery (e.g., 312) may be enclosed within their respective housings (e.g., 310) and the housings may be firmly closed together when placed in the closed configuration required for operation of the batteries, the dual RTC battery holder 300 in an embodiment may securely house two batteries with two safety mechanisms, while obscuring them from view during operation, in accordance with the requirements of the IEC62368 standards. The bottom battery 412 may be enclosed within the bottom battery housing 410, the top battery 422 may be enclosed within the top battery housing 410, and the top and bottom battery housings 410 and 420 may be firmly closed together when placed in the closed configuration required for operation of the batteries 412 and 422. Consequently, the dual RTC battery holder in an embodiment may securely house both batteries 412 and 422 while obscuring them from view during operation, in accordance with the requirements of the IEC62368 standards.

FIG. 4 is a cross-sectional view graphical illustration of a dual RTC battery power unit including RTC batteries inserted within a dual RTC battery holder placed in a closed configuration according to an embodiment of the present disclosure. As described herein, when placed in a closed configuration as shown in FIG. 4, the top battery housing 420 may stack directly atop the bottom battery housing 410, such that the negative terminal bottom surface 412a of the bottom battery 412 is situated closest to the PCB 470 to which the bottom battery housing 410 is operatively coupled. The bottom battery positive terminal top surface 412b may face the top battery positive terminal bottom surface 422b. In other words, the top and bottom batteries (e.g., 412 and 422) may have inverted positions with respect to one another. The top battery 422, top battery housing 420, bottom battery 412, bottom battery housing 410, positive and negative terminals, and PCB 470 may be combined to form a dual RTC battery power unit 400 in an embodiment.

The dual RTC battery unit 400 of the present disclosure may increase the total battery life without increasing the surface area of the PCB 470 dedicated to operatively coupling with such batteries (e.g., 412 and 422) through such a vertical stacking. By stacking the top and bottom battery housings (e.g., 410 and 420) vertically atop the PCB 470, as described directly above, the surface area of the PCB 470 dedicated to operatively coupling with the dual RTC battery holder 400 is limited to the surface area of the PCB 470 located directly beneath the bottom battery housing 420. In other words, addition of the second battery (e.g., 422) within the top battery housing 420 in embodiments described herein may be achieved without increasing the surface area of the PCB 470 dedicated to operatively coupling with the battery housings (e.g., 410) beyond that required for existing single-battery holder solutions.

The bottom battery 412 in such an embodiment may be inserted within the bottom battery housing 410 when a portion of top surface 412b of the bottom battery 412 is secured beneath the bottom interior retaining lip 413. The bottom interior retaining lip 413 in an embodiment may be comprised of the same material as the bottom battery housing 410 and may deform slightly radially outward from the interior of the bottom battery housing 410 with insertion pressure of the battery on the clip 413. Once the top surface 412b of the bottom battery 412 moves downward under the lower lip of the bottom interior retaining lip 413, the clip 413 may move back into its non-deformed position, such that a portion of the lower lip of the bottom interior retaining lip 413 partially extends across the top surface 412b of the bottom battery 412, to hold it firmly in place within the bottom battery housing 410. Similarly, the top battery 422 in such an embodiment may be inserted within the top battery housing 420 when a portion of the bottom surface 422b of the top battery 422 is secured above the top interior retaining lip 423. Once the bottom surface 422b of the top battery 422 moves beyond the upper lip of the top interior retaining lip 423, a portion of the upper lip of the top interior retaining lip 423 may partially extend across the bottom surface 422b of the top battery 422, to hold it firmly in place within the top battery housing 420.

The top battery housing 420 and bottom battery housing 410 may be secured together in an embodiment in a closed configuration depicted in FIG. 4 by a dual-latch protection system. As described directly above, each battery (e.g., 412 and 422) may be retained within its individual housing (e.g., 410 and 420) with an interior retaining lip (e.g., 413 and 423) that fixes the battery positions within their respective housings when the holder is placed in either an open or a closed configuration. As a second security measure, the top battery housing 420 may include an exterior fastener deformable molded plastic arm 452 that snaps into place beneath an exterior fastener lip 451 of the bottom battery housing 410 to firmly close and latch the top and bottom housings 410 and 420 together. The bottom battery 412 may be enclosed within the bottom battery housing 410, the top battery 422 may be enclosed within the top battery housing 410, and the top and bottom battery housings 410 and 420 may be firmly closed together when placed in the closed configuration required for operation of the batteries 412 and 422. Consequently, the dual RTC battery holder in an embodiment may securely house both batteries 412 and 422 while obscuring them from view during operation, in accordance with the requirements of the IEC62368 standards.

A bottom negative terminal 411 may be mounted within the bottom battery housing 410 in an embodiment such that the negative pole bottom surface 412a of the bottom battery 412 comes into electrically conductive contact with the bottom negative terminal 411 upon insertion of the bottom battery 412 within the bottom battery housing 410. The bottom negative terminal 411 in an embodiment may comprise a spring-loaded metallic element that deforms away from the lower, negative terminal bottom surface 412a of the bottom battery 412 upon insertion of the bottom battery 412 within the bottom battery housing 410, for example. The spring-loading of the bottom negative terminal 411 in such an embodiment may additionally provide an opposing force to firmly push the upper, positive terminal top surface 412b of the bottom battery 412 against the lower lip of the bottom interior retaining lip 413, to firmly fix the bottom battery 412 in place within the bottom battery housing 410. Similarly, a top negative terminal 421 may be mounted within the top battery housing 420 in an embodiment such that the negative terminal top surface 422a of the top battery 422 comes into electrically conductive contact with the top negative terminal 421 upon insertion of the top battery 422 within the top battery housing 420. The top negative terminal 421 in such an embodiment may also comprise a spring-loaded metallic element that deforms away from the upper, negative terminal top surface 422a of the top battery 422 and provides an opposing force to firmly push the lower, positive terminal bottom surface 422b of the top battery 422 against the lip of the top interior retaining lip 423.

The top negative terminal 421 and bottom negative terminal 411 in an embodiment may be machined or formed to include extended portions, such as the top negative terminal extended portion 432 and the bottom negative terminal extended portion 433, that may come into contact with one another when the dual RTC battery holder is placed in a closed configuration, as shown in FIG. 4. Thus, when clasped shut by the exterior fastener molded plastic arm 452, the downwardly pointing top negative terminal extended portion 432 may come into electrically conductive contact with the upwardly pointing bottom negative terminal extended portion 433, to electrically couple the negative terminal bottom surface 412a of the bottom battery 412 and the negative terminal top surface 422a of the top battery 422. This will put negative terminals 411 and 421, of the bottom battery 412 and the top battery 422 respectively, in parallel.

A positive terminal 431 may be mounted within the bottom battery housing 410 in an embodiment such that it comes into electrically conductive contact with the positive terminal surface 412b of the bottom battery 412 upon insertion of the battery 412 within the bottom battery housing 410, via an extension of the positive terminal 431 to contact the top surface 412b of the bottom battery 412. The positive terminal 431 in an embodiment may also be machined or formed to include an extended positive terminal portion 433 that may come into contact with the positive terminal bottom surface 422b of the top battery 422 housed within the top battery housing 420 when the dual RTC battery holder is placed in a closed configuration, as shown in FIG. 4. For example, the extended positive terminal portion 433 in an embodiment may extend radially inward toward the interior of the top battery housing 420 such that it extends partially across the lower, positive terminal bottom surface 422b of the top battery 422 when the dual RTC battery holder is placed in the closed configuration. In a closed configuration, this will put the positive terminal bottom surface 422b of the top battery 422 and positive terminal top surface 412b of the bottom battery 412 in parallel with one another. The positive terminal 431 and negative terminal 411 may also be electrically coupled to the PCB 470, for example, through soldering. In such a way, the dual RTC battery holder in an embodiment may place the top and bottom batteries (e.g., 412 and 422), housed within the top and bottom housings (e.g., 410 and 420), respectively, in parallel with one another, in order to increase the available power to generate current, and thus increase the lifetime of the combined batteries (e.g., as measured in mAh, or current over time). In such a way, the dual RTC battery holder may securely and safely house two RTC batteries for delivering power to the PCB in parallel.

Figure 5:
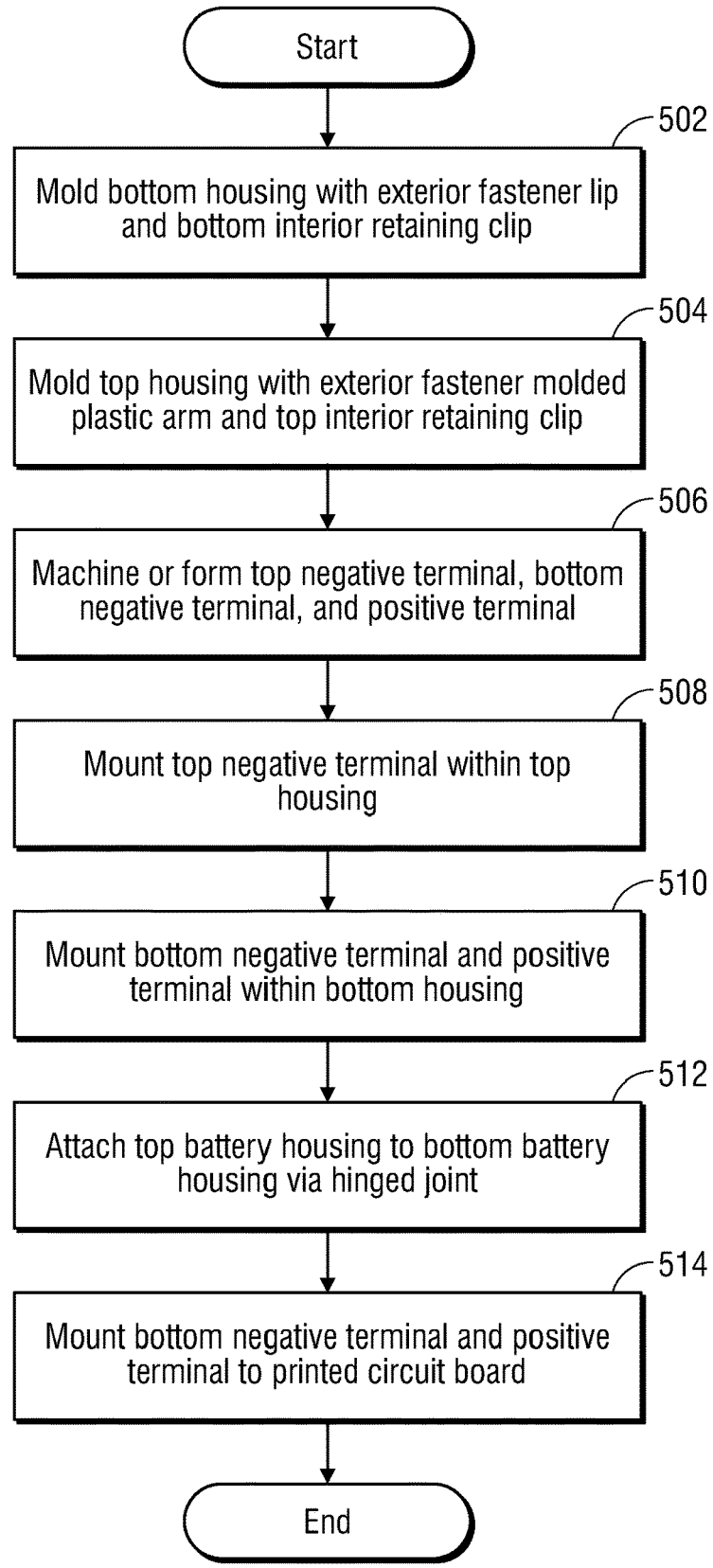
FIG. 5 is a flow diagram illustrating a method of manufacturing a dual RTC battery holder according to an embodiment of the present disclosure.

FIG. 5 is a flow diagram illustrating a method of manufacturing a dual RTC battery holder for placing batteries in a parallel circuit according to an embodiment of the present disclosure. As described herein, the dual RTC battery holder in an embodiment may increase the total battery life without increasing the surface area of the PCB dedicated to operatively coupling with such batteries, and may provide a dual-latch system for removal of batteries, in compliance with current safety standards.

At block 502, a bottom housing with an exterior fastener base and bottom interior retaining lip may be molded in an embodiment. For example, in an embodiment described with reference to FIG. 1, a bottom battery housing 110 may be formed of any electrically non-conductive material capable of retaining an RTC battery, including, for example, various plastics or ceramics. The bottom battery housing 110 may, for example, be formed via a plastic molding, injection molding, or three-dimensional printing method. The bottom battery housing 110 may be molded, printed, or otherwise manufactured to have an interior surface circumference capable of retaining an RTC battery of a known size. For example, the housings 110 in an embodiment may have an interior diameter measuring slightly larger than 20 mm to allow for insertion of a CR2032 battery. The bottom battery housing 110 in an embodiment may also be formed or molded to include receiver slots for insertion of positive and negative terminals. For example, in an embodiment described with reference to FIG. 4, the bottom battery housing 410 may be molded to include voids or openings through which the negative terminal 411 and positive terminal 431 may be inserted. The bottom battery housing 410 may also include a bottom molded hinge element forming a bottom portion of the hinge 440 in an embodiment. The bottom molded hinge element may also be molded in a similar fashion as the bottom battery housing 410.

The bottom battery housing in an embodiment may also include an exterior fastener lip and an interior retaining lip for fastening the bottom battery firmly into position within the bottom battery housing. For example, in an embodiment described with reference to FIG. 4, the bottom battery housing 410 may include an interior retaining lip 413, which may be comprised of the same material as the bottom battery housing 410. The interior retaining lip 413 may operate to fix the bottom battery 412 within the bottom battery housing 410 when the dual RTC battery holder is either in an open configuration (e.g., as shown with respect to FIGS. 1 and 2) or in a closed configuration (e.g., as shown with respect to FIGS. 3 and 4). The bottom battery housing may include an exterior fastener lip in some embodiments. An exterior fastener lip 451 may also form a part of the bottom battery housing 410 in an embodiment. For example, the bottom battery housing 410 may include an exterior fastener lip 451, operating in tandem with the exterior fastener molded plastic arm 452 of the top battery housing 420 to securely place the dual RTC battery holder in a closed configuration, as described in greater detail with respect to FIG. 6, below.

In an embodiment, a top housing with an exterior fastener molded plastic arm and top interior retaining lip may be molded at block 504. For example, in an embodiment described with reference to FIG. 1, in an embodiment described with reference to FIG. 1, a top battery housing 120 may be formed of any electrically non-conductive material capable of retaining an RTC battery, including, for example, various plastics or ceramics. The top battery housing 120 may, for example, be formed via a plastic molding, injection molding, or three-dimensional printing method to have an interior surface circumference capable of retaining an RTC battery of a known size, such as a CR2032 battery. The top battery housing 120 in an embodiment may also be formed or molded to include a receiver slot for insertion of a negative terminal. For example, in an embodiment described with reference to FIG. 4, the top battery housing 420 may be molded to include a void or opening through which the negative terminal 421 may be inserted. The top battery housing 420 may also include a top molded hinge element forming a top portion of the hinge 440 in an embodiment. The top molded hinge element may also be molded in a similar fashion as the top battery housing 420.

The top battery housing in an embodiment may also include an interior retaining lip for fastening the top battery firmly into position within the top battery housing. For example, in an embodiment described with reference to FIG. 4, the top battery housing 420 may include an interior retaining lip 423, which may be comprised of the same material as the top battery housing 420. The interior retaining lip 423 may operate to fix the top battery 422 within the top battery housing 420 when the dual RTC battery holder is either in an open configuration (e.g., as shown with respect to FIGS. 1 and 2) or in a closed configuration (e.g., as shown with respect to FIGS. 3 and 4). An exterior fastener molded plastic arm 452 may also form a part of the top battery housing 420 in an embodiment. For example, the top battery housing 420 may include an exterior fastener molded plastic arm 452, operating in tandem with the exterior fastener lip 451 of the bottom battery housing 410 to securely place the dual RTC battery holder in a closed configuration, as described in greater detail with respect to FIG. 6, below.

At block 506, a top negative terminal, bottom negative terminal, and positive terminal may be machined or formed in an embodiment. For example, as described in an embodiment with respect to FIG. 1, a top negative terminal 121, bottom negative terminal 111, and positive terminal 131 may be machined or formed, such as by pressed sheet metal or by other techniques, from any type of electrically conductive material, such as copper, zine, aluminum, gold, or silver, for example. A top negative terminal 121 and bottom negative terminal 111 in an embodiment may be machined or formed to include extended portions (e.g., extended portion 132 of the top negative terminal 121) that may come into contact with one another when the dual RTC battery holder 100 is placed in a closed configuration, as described in greater detail with respect to FIG. 4, below. The positive terminal 131 in an embodiment may also be machined or formed to include an extended portion that may come into contact with the positive terminal surface of the top battery housed within the top battery housing 120 when the dual RTC battery holder 100 is placed in a closed configuration, as also described in greater detail with respect to FIG. 4, below.

In an embodiment, the top negative terminal may be mounted within the top housing at block 508. For example, a top negative terminal 121 may be inserted partially within or otherwise mounted to the top battery housing 120. As another example, negative terminal 121 may be installed within a molder receiver slot or void in the top battery housing 110 in an embodiment. As yet another example, in an embodiment described with reference to FIG. 4, a top negative terminal 421 may be mounted within the top battery housing 420 in an embodiment such that the negative terminal top surface 422a of the top battery 422 comes into electrically conductive contact with the top negative terminal 421 upon insertion of the top battery 422 within the top battery housing 420. The top negative terminal 421 in such an embodiment may also comprise a spring-loaded metallic element that deforms away from the upper, negative terminal top surface 422a of the top battery 422 and provides an opposing force to firmly push the lower, positive terminal bottom surface 422b of the top battery 422 against the upper lip of the top interior retaining lip 423.

At block 510, a bottom negative terminal and positive terminal in an embodiment may be mounted within the bottom housing. For example, in an embodiment described with reference to FIG. 4, a bottom negative terminal 411 may be mounted within the bottom battery housing 410 in an embodiment such that the negative terminal bottom surface 412a of the bottom battery 412 comes into electrically conductive contact with the bottom negative terminal 411 upon insertion of the bottom battery 412 within the bottom battery housing 410. As another example, negative terminal 411 may be installed in a molded receiver slot or void within the bottom battery housing 410 in some embodiments. The bottom negative terminal 411 in such an embodiment may also comprise a spring-loaded metallic element that deforms away from the lower, negative terminal bottom surface 412a of the bottom battery 412 and provides an opposing force to firmly push the upper, positive terminal top surface 412b of the bottom battery 412 against the lower lip of the bottom interior retaining lip 413.

The top battery housing may be attached to the bottom battery housing in an embodiment, via a hinged joint at block 512. The dual RTC battery holder 100 may comprise a bottom battery housing 110 mechanically coupled to a top battery housing 120. For example, as shown in FIG. 1, the bottom battery housing 110 may be mechanically joined to the top battery housing 120 via a hinge joint 140 formed of molded hinge components in the top and bottom battery housings operatively coupled via a pin or other hinge element in some embodiments.

The bottom negative terminal and positive terminal of the assembled RTC battery holder or just the bottom battery housing in an embodiment may be mounted to a printed circuit board at block 514. For example, in an embodiment described with reference to FIG. 4, the positive terminal 431 and negative terminal 411 may also be electrically coupled to the PCB 470 through soldering. By stacking the top and bottom battery housings (e.g., 410 and 420) vertically atop the PCB 470, as described directly above, the surface area of the PCB 470 dedicated to operatively coupling with the dual RTC battery holder is limited to the surface area of the PCB 470 located directly beneath the bottom battery housing 420. In other words, addition of the second battery (e.g., 422) within the top battery housing 420 in embodiments described herein may be achieved without increasing the surface area of the PCB 470 dedicated to operatively coupling with the battery housings (e.g., 410) beyond that required for existing single-battery holder solutions. In such a way, the dual RTC battery power unit 400 of the present disclosure may increase the total battery life without increasing the surface area of the PCB 470 dedicated to operatively coupling with such batteries (e.g., 412 and 422) through such a vertical stacking. The method for manufacturing a dual RTC battery holder in an embodiment may then end.

Figure 6:
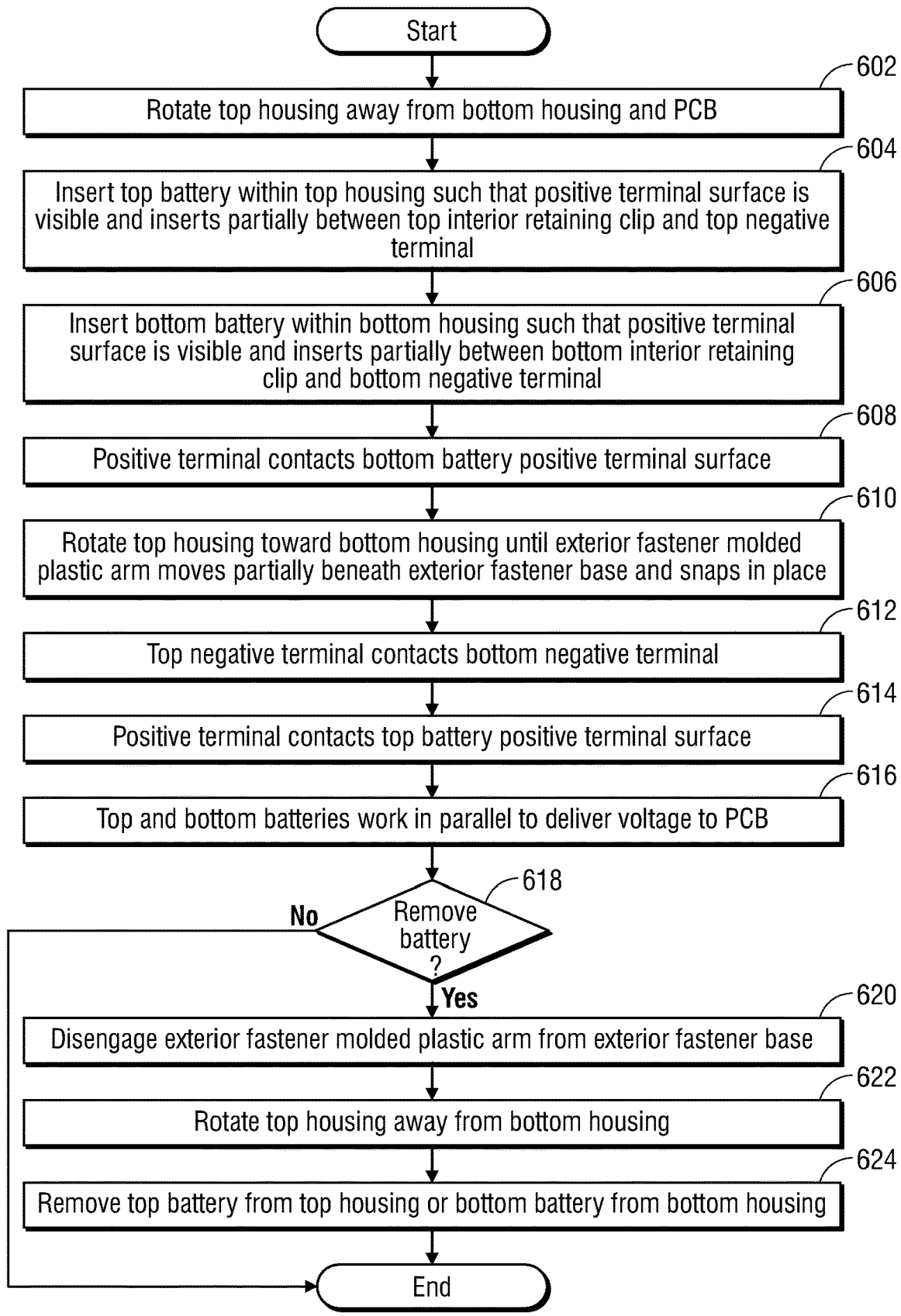
FIG. 6 is a flow diagram illustrating a method of operating a dual RTC battery holder according to an embodiment of the present disclosure.

FIG. 6 is a flow diagram illustrating a method of operating batteries housed within a dual RTC battery holder according to an embodiment of the present disclosure. As described herein, the dual RTC battery holder in an embodiment may place the top and bottom batteries, housed within the top and bottom housings, respectively, in parallel with one another, in order to increase the power available for current, and thus increase lifetime of the combined batteries (e.g., as measured in mAh, or current over time).

At block 602, the top housing of the dual RTC battery holder in an embodiment may be rotated away from the bottom housing and PCB. For example, in an embodiment described with reference to FIG. 1, the top battery housing 120 may be rotated away from the bottom battery housing 110, allowing for insertion of a battery within the top battery housing 120 or the bottom battery housing 110.

A top battery may be inserted within the top housing in an embodiment at block 604, such that the positive terminal surface of the battery is visible and inserted partially between the interior retaining lip and top negative terminal. For example, in an embodiment described with reference to FIG. 2, a top battery 222 may be inserted within the top battery housing 220 such that the positive terminal surface of the battery is visible and inserted partially under the top interior retaining lip 223 into a cavity of the top battery housing 220. As another example, in an embodiment described with reference to FIG. 4, the positive terminal bottom surface 422b of the top battery 422 may be inserted partially between the top interior retaining lip 423 and the top negative terminal 421. As the top battery 422 is inserted within the top battery housing 420 in an embodiment, the top interior retaining lip 423 may deform slightly radially outward from the interior cavity of the top battery housing 420 when the user applies force to the positive terminal bottom surface 422b to move the battery 422 into the cavity and towards the top negative terminal 421. Once the bottom surface 422b of the top battery 422 moves beyond the lip of the top interior retaining lip 423, the clip 423 may move back into its non-deformed position, such that a portion of the upper lip of the top interior retaining lip 423 partially extends across the bottom surface 422b of the top battery 422, to hold it firmly in place within the cavity of the top battery housing 420.

At block 606, a bottom battery may be inserted within the bottom housing in an embodiment such that the positive terminal surface is visible and inserted partially beneath the bottom interior retaining lip and the bottom negative terminal. For example, in an embodiment described with reference to FIG. 2, a bottom battery 212 may be inserted within a cavity within the bottom battery housing 210 such that the positive terminal surface of the battery is visible and inserted partially beneath the bottom interior retaining lip 213. As another example, in an embodiment described with reference to FIG. 4, the positive terminal top surface 412b of the bottom battery 412 may be inserted partially into a cavity between the bottom interior retaining lip 413 and the bottom negative terminal 411. As the bottom battery 412 is inserted into a cavity within the bottom battery housing 410 in an embodiment, the bottom interior retaining lip 413 may deform slightly radially outward from the interior cavity of the bottom battery housing 410 when the user applies force to the positive terminal top surface 412b to move the battery 412 into the cavity and towards the bottom negative terminal 411. Once the top surface 412b of the bottom battery 412 moves beyond the lower lip of the bottom interior retaining lip 413, the clip 413 may move back into its non-deformed position, such that a portion of the lower lip of the bottom interior retaining lip 413 partially extends across the top surface 412b of the bottom battery 412, to hold it firmly in place in the cavity within the bottom battery housing 410.

The positive terminal in an embodiment may contact the bottom battery positive terminal surface at block 608. For example, the positive terminal 431 may be mounted within the bottom battery housing 410 in an embodiment such that it comes into electrically conductive contact with the positive terminal surface 412b of the bottom battery 412 upon insertion of the battery 412 within the bottom battery housing 410.

At block 610, the top housing may be rotated toward the bottom housing in an embodiment until the exterior fastener molded plastic arm moves partially beneath the exterior fastener base and snaps into place. The top battery housing 420 and bottom battery housing 410 may be secured together in an embodiment in a closed configuration depicted in FIG. 4 by a dual-latch protection system. As described directly above, each battery (e.g., 412 and 422) may be retained within its individual housing (e.g., 410 and 420) with an interior retaining lip (e.g., 413 and 423) that fixes the battery positions within their respective housings when the holder is placed in either an open or a closed configuration. As a second security measure, the top battery housing 420 may include an exterior fastener molded plastic arm 452 that snaps into place beneath an exterior fastener lip 451 of the bottom battery housing 410 to firmly close and latch the top and bottom housings 410 and 420 together. The bottom battery 412 may be enclosed within the bottom battery housing 410, the top battery 422 may be enclosed within the top battery housing 410, and the top and bottom battery housings 410 and 420 may be firmly closed together when placed in the closed configuration required for operation of the batteries 412 and 422. Consequently, the dual RTC battery holder in an embodiment may securely house both batteries 412 and 422 while obscuring them from view during operation, in accordance with the requirements of the IEC62368 standards.

The top negative terminal in an embodiment may contact the bottom negative terminal at block 612. The top negative terminal 421 and bottom negative terminal 411 in an embodiment may be machined or formed to include extended portions (e.g., top negative terminal extended portion 432 and bottom negative terminal extended portion 433) that may come into contact with one another when the dual RTC battery holder is placed in a closed configuration, as shown in FIG. 4. Thus, when clasped shut by the exterior fastener molded plastic arm 452, the downwardly pointing top negative terminal extended portion 432 may come into electrically conductive contact with the upwardly pointing bottom negative terminal extended portion 433, to electrically couple the negative terminal bottom surface 412*a* of the bottom battery 412 and the negative terminal top surface 422*a* of the top battery 422.

At block 614, the positive terminal in an embodiment may contact the top battery positive terminal surface. The positive terminal 431 in an embodiment may be machined or formed to include an extended positive terminal portion 433 that may come into contact with the positive terminal bottom surface 422*b* of the top battery 422 housed within the top battery housing 420 when the dual RTC battery holder is placed in a closed configuration, as shown in FIG. 4. For example, the extended positive terminal portion 433 in an embodiment may extend radially inward toward the interior of the top battery housing 420 such that it extends partially across the lower, positive terminal bottom surface 422*b* of the top battery 422 when the dual RTC battery holder is placed in the closed configuration.

The top and bottom batteries in an embodiment may work in parallel to deliver voltage to the PCB at block 616. Electrically coupling the positive terminal surfaces of the top battery and bottom battery together via the positive terminal, electrically coupling the negative terminal surfaces of the top battery and bottom battery together via the negative terminals, and electrically coupling the negative terminals and the positive terminal to the PCB may complete a parallel circuit. Placing the batteries in parallel with one another in such a way may increase the total power available to generate current supplied to the PCB by the two batteries, and thus increase lifetime of the combined batteries (e.g., as measured in mAh, or current over time).

At block 618, a user may determine whether to remove one or both batteries in an embodiment. If the user wishes to remove one or both batteries in an embodiment, the method may proceed to block 620 to open the dual RTC battery holder. If the user does not wish to remove one or both batteries, the batteries housed within the dual RTC battery holder may continue to deliver voltage to the PCB, and the method for operating the batteries may then end.

In an embodiment in which the user wishes to remove one or both batteries from the dual RTC battery holder, the exterior fastener molded plastic arm may be disengaged from the exterior fastener base at block 620. For example, in an embodiment described with reference to FIG. 3, a user may pull the bottom portion of the exterior fastener molded plastic arm 352 away from the bottom battery housing 310. In another example embodiment shown in FIG. 4, the exterior fastener molded plastic arm 452 may be pulled away from the exterior fastener lip 451 until the exterior fastener molded plastic arm 452 is no longer disposed beneath the exterior fastener lip 451.

At block 622, the top housing may be rotated away from the bottom housing in an embodiment. The positive terminal 431 in such an embodiment may comprise a spring-loaded metallic element exerting upward force on the top battery housing 420, such that the exterior fastener molded plastic arm 452 is forced upward in the absence of contact with the exterior fastener lip 451. This upward force may cause the top battery housing 420 to rotate away from the bottom battery housing 410 (e.g., in a clockwise motion with respect to FIG. 4).

The top battery may be removed from the top housing, or the bottom battery may be removed from the bottom housing in an embodiment at block 624. As shown in FIG. 2, when placed in an open configuration, both the top battery 220 and bottom battery 210 may be accessible to a user. Either of these batteries (e.g., 210 or 220) may be removed by a user by pulling the battery away from the battery housing on the side of the battery located farthest from the interior retaining lip. For example, the top battery 220 may be removed by grasping either side of the top battery 222 and rotating the side of the battery 222 located closest to the hinge 240 and farthest from the interior retaining lip 223 until the top surface of the top battery 222 is no longer in contact with the interior retaining lip 223. The method for operating batteries housed within the dual RTC battery holder in an embodiment may then end.

The blocks of the flow diagrams of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A dual real-time clock (RTC) battery power unit comprising:
   a top battery housing for retaining a first RTC battery within a first cavity and a first hinge element;
   a bottom battery housing for retaining a second RTC battery within a second cavity and a second hinge element reciprocal to the first hinge element;
   the top battery housing having an exterior fastener molded plastic arm for partially inserting beneath an exterior fastener lip of the bottom battery housing when the top battery housing and bottom battery housing are placed in a closed clamshell configuration;
a positive terminal mounted within the bottom battery housing to contact a second RTC battery positive terminal surface;
a bottom negative terminal mounted within the bottom battery housing to contact a second RTC battery negative terminal surface;
a top negative terminal mounted within the top battery housing to contact a first RTC battery negative terminal surface;
the top battery housing and bottom battery housing operably connected to one another to form the closed clamshell configuration disposing the bottom battery housing between the top battery housing and a printed circuit board (PCB), electrically coupling the top negative terminal and the bottom negative terminal, and placing the bottom negative terminal in contact with a first RTC battery positive terminal surface; and
the printed circuit board (PCB) electrically coupled to the bottom negative terminal and the positive terminal to form a parallel circuit drawing voltage from the first RTC battery and the second RTC battery.

2. The dual RTC battery power unit of claim 1 further comprising:
the top battery housing having a top interior retaining lip protruding radially inward from an interior top housing surface for retaining the first RTC battery.

3. The dual RTC battery power unit of claim 1 further comprising:
the top battery housing having a top interior retaining lip protruding radially inward from an interior top housing surface deformable to allow insertion of the top battery within the first cavity upon application of a first insertion force on the first RTC battery into the top battery housing.

4. The dual RTC battery power unit of claim 1 further comprising:
the bottom battery housing having a bottom interior retaining lip protruding radially inward from an interior bottom housing surface for retaining the second RTC battery.

5. The dual RTC battery power unit of claim 3 further comprising:
the bottom battery housing having a bottom interior retaining lip protruding radially inward from an interior bottom housing surface deformable to allow insertion of the bottom battery within the second cavity upon application of a second insertion force on the second RTC battery into the bottom battery housing.

6. The dual RTC battery power unit of claim 1, wherein the PCB is a component board in an information handling system.

7. The dual RTC battery power unit of claim 1, wherein the first RTC battery and the second RTC battery are button cell batteries having a fully charged energy capacity of 220 mAh.

8. A method of manufacturing a dual real-time clock (RTC) battery power unit comprising:
molding a top battery housing for retaining a first RTC battery within a top battery housing cavity upon application of a first insertion force on the first RTC battery, having an exterior fastener molded plastic arm protruding along an exterior surface of the top battery housing for partially inserting beneath an exterior fastener lip of a bottom battery housing when the top battery housing and the bottom battery housing are placed in a closed clamshell configuration;
molding the bottom battery housing for retaining a second RTC battery within a bottom battery housing cavity upon application of a second insertion force on the second RTC battery, having the exterior fastener lip extending radially outward from a bottom exterior surface of the bottom battery housing;
mounting a positive terminal within the bottom battery housing to contact a second RTC battery positive terminal surface and a positive terminal extension to contact a first RTC battery positive terminal surface;
mounting a bottom negative terminal within the bottom battery housing to contact a second RTC battery negative terminal surface;
mounting a top negative terminal within the top battery housing to contact a first RTC battery negative terminal surface;
operably connecting the top battery housing and the bottom battery housing to one another to form the closed clamshell configuration disposing the bottom battery housing between the top battery housing and a printed circuit board (PCB), wherein the top negative terminal and the bottom negative terminal are electrically coupled in the closed clamshell configuration; and
electrically coupling a printed circuit board (PCB) to the bottom negative terminal and the positive terminal to form a parallel circuit for drawing voltage from the first RTC battery and the second RTC battery.

9. The method of claim 8 further comprising:
molding the top battery housing to have a top interior retaining lip protruding radially inward from an interior top housing surface for retaining the first RTC battery when the top battery housing and the bottom battery housing are placed in an open configuration.

10. The method of claim 8 further comprising:
molding the top battery housing to have a top interior retaining lip protruding radially inward from an interior top housing surface deformable to allow insertion of the first RTC battery within the top battery housing cavity upon application of the first insertion force on the first RTC battery.

11. The method of claim 8 further comprising:
molding the bottom battery housing to have a bottom interior retaining lip protruding radially inward from an interior bottom housing surface for retaining the second RTC battery when the top battery housing and the bottom battery housing are placed in an open configuration.

12. The method of claim 8 further comprising:
molding the bottom battery housing to have a bottom interior retaining lip protruding radially inward from an interior bottom housing surface deformable to allow insertion of the second RTC battery within the bottom battery housing cavity upon application of the second insertion force on the second RTC battery.

13. The method of claim 8, wherein the first RTC battery and the second RTC battery are button cell batteries measuring 20 mm in diameter and 3.2 mm in height.

14. The method of claim 8, wherein the first RTC battery and the second RTC battery are button cell batteries having a fully charged energy capacity of 220 mAh.

15. A dual real-time clock (RTC) battery power unit comprising:
a top battery housing for retaining a first RTC battery within a top battery housing cavity having an exterior fastener molded plastic arm protruding along an exterior surface of the top battery housing and a top interior retaining lip protruding radially inward from an interior top housing surface for retaining the first RTC battery;

the bottom battery housing for retaining a second RTC battery within a bottom battery housing cavity up having an exterior fastener lip extending radially outward from a bottom exterior surface of the bottom battery housing, and a bottom interior retaining lip protruding radially inward from an interior bottom housing surface for retaining the second RTC battery;

a positive terminal mounted within the bottom battery housing to contact a second RTC battery positive terminal surface and a positive terminal extension to contact a first RTC battery positive terminal surface;

a bottom negative terminal mounted within the bottom battery housing to contact a second RTC battery negative terminal surface;

a top negative terminal mounted within the top battery housing to contact a first RTC battery negative terminal surface;

the exterior fastener molded plastic arm partially inserting beneath the exterior fastener lip when the top battery housing and bottom battery housing are placed in a closed clamshell configuration; and the top battery housing and bottom battery housing operably connected to one another to form the closed clamshell configuration disposing the top battery housing over the bottom battery housing and electrically coupling the top negative terminal and the bottom negative terminal, and placing the positive terminal extension in contact with the first RTC battery positive terminal surface; to the negative terminal and the positive terminal.

16. The dual RTC battery power unit of claim 15 further comprising:

the negative terminal and the positive terminal of the bottom battery housing electrically coupled to a printed circuit board (PCB) to form a parallel circuit drawing voltage from the first RTC battery and the second RTC battery and configured to power components on the PCB.

17. The dual RTC battery power unit of claim 16, wherein the PCB is a component board in an information handling system.

18. The dual RTC battery power unit of claim 15 further comprising:

the top battery housing having a top interior retaining lip protruding radially inward from an interior top housing surface deformable to allow insertion of the top battery within the top battery housing cavity upon application of the first insertion force on the first RTC battery.

19. The dual RTC battery power unit of claim 15 further comprising:

the bottom battery housing having a bottom interior retaining lip protruding radially inward from an interior bottom housing surface deformable to allow insertion of the bottom battery within the bottom battery housing cavity upon application of the second insertion force on the second RTC battery.

20. The dual RTC battery power unit of claim 15, wherein the first RTC battery and the second RTC battery are button cell batteries having a fully charged energy capacity of 240 mAh.

* * * * *